United States Patent [19]

Sheiman

[11] Patent Number: 4,772,094
[45] Date of Patent: Sep. 20, 1988

[54] OPTICAL STEREOSCOPIC SYSTEM AND PRISM WINDOW

[75] Inventor: David M. Sheiman, Los Angeles, Calif.

[73] Assignee: Bright and Morning Star, Lawndale, Calif.

[21] Appl. No.: 698,385

[22] Filed: Feb. 5, 1985

[51] Int. Cl.$^4$ .......................... G02B 27/22; G02B 3/08
[52] U.S. Cl. .................................... 350/133; 350/130; 350/452
[58] Field of Search ........................ 350/130, 133, 452

[56] References Cited

FOREIGN PATENT DOCUMENTS

| 445812 | 2/1949 | Italy | 350/130 |
| 52-10151 | 1/1977 | Japan | 350/452 |
| 57-115501 | 7/1982 | Japan | 350/452 |
| 343230 | 1/1960 | Switzerland | 350/133 |

Primary Examiner—John K. Corbin
Assistant Examiner—Scott J. Sugarman
Attorney, Agent, or Firm—Plante Strauss Vanderburgh

[57] ABSTRACT

There is disclosed an optical stereoscopic system having a prism window which permits free viewing of left and right steroscopic images by an observer. The prism window comprises a pair of prisms positioned with their long sides medially and their short sides laterally, and in abutting and joined relationship. Preferably, the prisms are thin plate prisms, each having a plano face and an opposite prism face formed with a plurality of parallel V-grooves to form, therebetween, a plurality of parallel triangular prisms. The optical system includes left and right stereoscopic imaging surfaces for display of normal, i.e., unreversed, left and right stereoscopic images. The prism window is placed in front of the imaging surfaces and a three dimensional image can be seen by an observer witnessing through a prism window.

12 Claims, 4 Drawing Sheets

OPTICAL STEREOSCOPIC SYSTEM AND PRISM WINDOW

BACKGROUND OF THE INVENTION

1. Field Of The Invention

This invention relates to a three-dimensional viewing system and, in particular, to a system permitting viewing of left and right stereoscopic images by a plurality of observers.

2. Brief Statement Of The Prior Art

A system for three-dimensional imaging of optical images was invented almost 150 years ago. In 1849, the system was improved by Brewster who used a pair of solid wedge prisms, and refined further by Holmes, who added a pair of convex lens eyepieces, giving birth to the popular stereoscope, in which a hooded eyepiece was provided with left and right prismatic lenses of short focal length, and a central rail with a wooden slide to hold left and right stereoscopic photographic images. One focused the images by moving the slide toward, or away from, one's eyes. This stereoscope has not been improved upon for the past 75 years. While this stereoscope provided a single viewer with enjoyable three-dimensional viewing, it has not found other applications because it is limited to viewing by a single observer and because it requires the use of photographic images which must be manually inserted into the slide holder.

Sheiman and Rudell in U.S. Pat. Nos. 4,235,515 and 4,422,720 describe stereoscopic image display utilizing one or two Fresnel prisms. These systems, however, are best suited for viewing by one or two observers, and require display of left and right images at ninety degrees to each other, thus restricting usage and complicating monitor displays. These systems also are not readily adaptable to display of large images. Discrimination by an observer of each stereoscopic image is achieved by light refraction or reflection, resulting in critical positioning of the observer for correct viewing.

Swan, in U.S. Pat. No. 51,906 issued in 1866 discloses a stereoscopic image display using two, solid core, right angle prisms. This system has the same limitations as the aforementioned Sheiman and Rudell patents and, additionally is very bulky and cumbersome and further greatly limits the size of the images. This system is entirely incompatible with single monitor (CRT) display.

Baumgardner, in U.S. Pat. No. 3,972,596, describes use of a flat Fresnel lens for image magnification or compression, as in a wide angle lens application. Baumgardner's employment of Fresnel optics is for one image, only without any suggestion of image pairs for any purpose, particularly stereoscopy.

Prior stereoscopic systems have used right and left image coding with polarized or monochromatic-color light and eyepieces having polarized or colored filters worn by the observers. In all past systems, however, it has been necessary to encode the images at their projection site and to use a special screen to maintain polarity of the displayed images. These requirements have prevented application to electronic image display, e.g., television, since polarization cannot be achieved or maintained during electronic transmission or monitor display. Additionally, the stereoscopic images have typically been superimposed over each other at the point of final display and separate polarization of each image has to be performed prior to the superimposition and then maintained throughout transmission to the point of final display to a viewer or viewers. While this is acceptable in a movie theater, where polarizing elements can be positioned in front of a projection device and the separate images can undergo polarization as they pass through the elements and onto a special screen which maintains polarization, it has precluded applications in telephonic, fiber optic and electronic image transmission and broadcasting.

BRIEF STATEMENT OF THE INVENTION

This invention comprises a free-viewing stereoscopic system in which left and right stereoscopic optical images are displayed, side-by-side, and viewed through a prism window by an observer. Since no encoding of the left and right images is necessary, the observer does not need to wear decoding eyepieces, and the system is thus, free-viewing. The system includes the left and right imaging surfaces for the display of normal, i.e., unreversed, left and right stereoscopic images, and a prism window.

The prism window comprises a pair of triangular prisms which are oriented with their long sides medially and their short sides laterally, and are abutted or joined along their mating, medial edges. Preferably, the prism window is formed with a pair of thin plate prisms, each of which has a plano face and a faceted face, the latter having a plurality of parallel V-grooves which form, therebetween, a plurality of parallel, triangular prisms. The V-grooves can be straight and can be evenly spaced. Preferably, the grooves are circular and are oriented convex medially and concave laterally. The circular grooves of the prisms are concentric about center points which are located laterally in the assembly. This system has a great freedom of display and viewing parameters. Virtually any stereoscopic display can be used, without the need to reverse the left and right images, or to use mirrors, and without the need to encode, left and right, the images. The images can be displayed without precise inter-image spacing, and a single pair of displayed images can be viewed by a plurality of observers who can experience the pleasure of three-dimensional viewing without decoding eyepieces. The display of the stereoscopic image is simply observed through the prism window of the invention, and the spacing of the window from the image display, and the distance between the observer and the window can be adjusted to accomodate the spacing between the images. The system is particularly adaptable to electronic imaging and image transmission since the images can be displayed on a television monitor for three dimiensional viewing.

BRIEF DESCRIPTION OF THE DRAWINGS

The invention will be described with reference to the Figures, of which.

DESCRIPTION OF THE PREFERRED EMBODIMENTS

Figure 1:
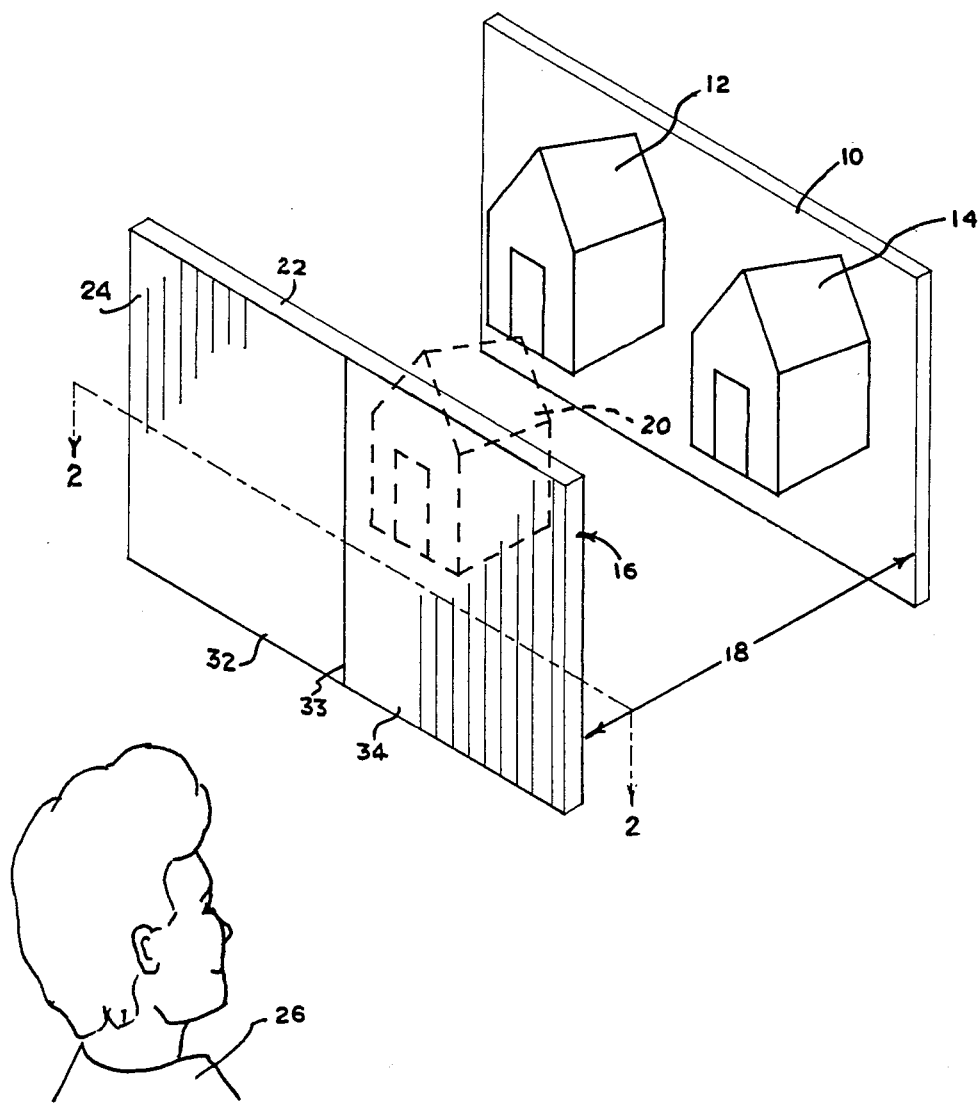
FIG. 1 is a perspective view of the system of the invention.

The invention is shown in FIG. 1 as an optical stereoscopic system in which a left stereoscopic image 12 and a right stereoscopic image 14 are displayed on left and right display surfaces which appear as a a single screen 10. The screen can be a typical movie or slide projection screen or can be the screen of a television receiver, television projection screen or a backlighted X-ray or photgraphic transparency lightbox, and the like. The images are displayed on screen 10 in normal, i.e., unreversed alignment, and need not be encoded, in contrast to some stereoscopic systems which require encoding with polarized or monochromatic light to distinguish the left and right images.

The left and right stereoscopic images are fused into a unitary image 20 by the prism window 16 which is positioned a slight distance 18 in front of the screen 10. The prism window 16 functions to fuse the left and right stereoscopic images 12 and 14 into the unitary image 20 which appears in space near the face of the prism window 16. The prism window 16 can be formed of solid, massive prisms, or can be thin-plate (Fresnel) prisms. The latter is preferred and comprises a pair of thin plate (or Fresnel) prisms 32 and 34, each having a plano face 22 and a faceted face 24. The faceted face 24 is formed with a plurality of substantially parallel V-grooves which subdivide the faceted face into a plurality of prisms having a triangular cross-section. The V-grooves can be a plurality of substantially parallel, vertical grooves extending across the entire face of the prism, and these V-grooves can be evenly spaced to provide, therebetween, evenly spaced, triangular prisms. Because of the scale of FIG. 1, the grooves and prisms appear in lines, however, the structure is shown in greater detail in FIG. 2.

An observer 26 can "free-view" the display through the prism window 16, by centrally positioning the prism window 16 in front of the image display. The observer can use his unaided eyes and need not wear any decoding eyepieces. The line 33 between the abutted prisms usually will be sufficiently apparent that it can be used as an aid to orient the prism window centrally to the displayed images. If desired, however, this line can be made more pronounced by providing a hairline mark over the line 33.

Figure 2:
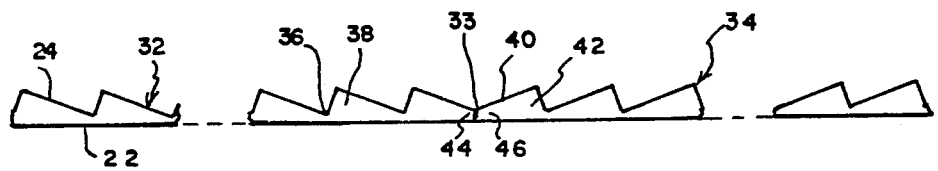
FIG. 2 is a sectional view along line 2—2 of FIG. 1.

Referring now to FIG. 2, the structure of the prism window 16 will be described in greater detail. Each Fresnel prism 32 and 34 has a smooth or plano face 22 and an opposite faceted face 24. As also previously mentioned, the faceted face is preferably formed by a plurality of V-grooves 36 which are straight and parallel and are evenly spaced across the faceted faces 24 of prisms 32 and 34. This subdivides each faceted face 24 into a like plurality of parallel and evenly spaced, individual prisms 38. The sectional view of FIG. 2 is significally expanded for illustration purposes. Preferably, the V-grooves are spaced as closely across the faceted faces 24 as economically possible with conventional manufacturing techniques. Typically, prisms can be manufactured having from 20 to about 500 prisms per linear inch of distance across the faceted faces 24. Preferably, the prisms are spaced sufficiently close to provide from 50 to about 200 prisms per linear inch. The greater number of prisms per linear inch is preferred because of the greater resolution achieved when using a higher number of prisms. The separate Fresnel prisms 32 and 34 are oriented with their long sides 40 medially and their short sides 42 laterally, and joined together along their medial edges 44 and 46.

Figure 3:
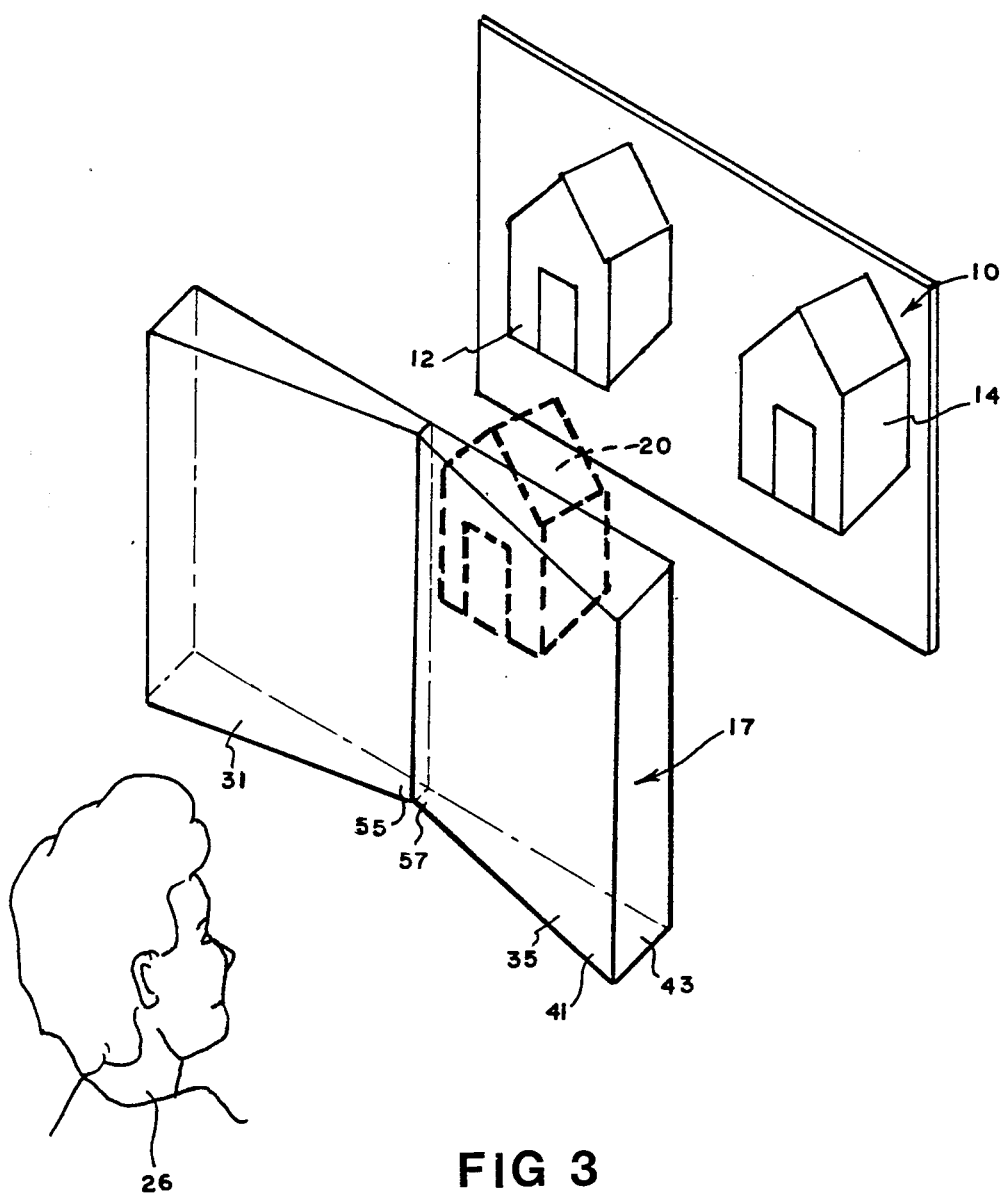
FIG. 3 is a perspective view of another embodiment of the invention.

Referring now to FIG. 3, an alternative, and less preferred viewing system is illustrated. This system uses a screen 10 for the side-by-side display of left and right stereoscopic images 12 and 14, as described with reference to the embodiment of FIG. 1. The observer 26 is positioned in front of the prism window 17 for free-viewing of the three-dimensional image 20. The prism window 17 is an assembly of a pair of solid wedge prisms 31 and 35 which are oriented with their long sides 41 medially and their short sides 43 laterally and are abutted into a joined relationship along their medial edges 55 and 57. The prisms 31 and 35 can be solid form, of any optical quality transparent material such as glass, acrylic polymer, or polycarbonate. To reduce the cost of such prisms, they can be manufactured as hollow form prisms and filled with a clear oil or water. Although the drawing illustrates only a single observer 26, additional observers can also view the image display through their separate prism windows which can be placed to either side of the prism window 16 shown in the drawing.

Figure 4:
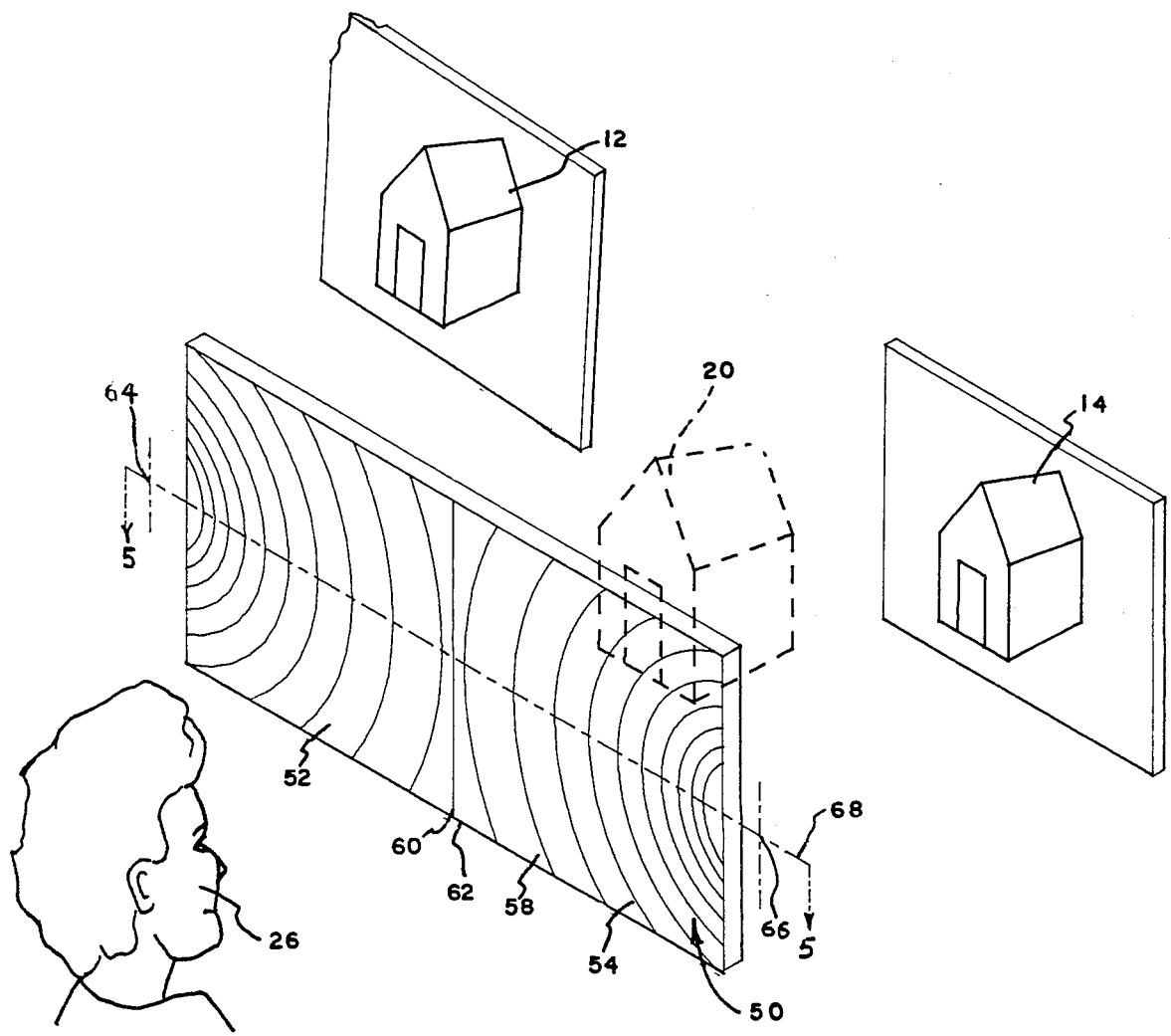
FIG. 4 is a perspective view of an embodiment with the preferred prism window of the invention.

It is preferred to employ an image magnification means in the system. A separate magnification lens, e.g., a flat plate Fresnel magnification lens can be used and positioned in front of the prism window 16 in the FIG. 1 embodiment. Alternatively, a thin plate combined prism and magnification lens can be used. This embodiment is shown in FIG. 4. As there illustrated, the left stereoscopic images 12 and 14 is viewed by an observer 26 through a prism window 50 having prism and magnification properties. The prism window 50 is an assembly of two halves 52 and 54 of a Fresnel magnification lens each having a plano face 56 and a faceted face 58. The latter is formed by a plurality of arcuate V-gooves which are concentric circular grooves and which are oriented convex medially and concave laterally in the assembly. The medial edges 60 and 62 of the halves 52 and 54 are joined to form the prism window 50. The arcuate grooves are concentric about laterally disposed center points 64 and 66 which, preferably, lie along the longitudial axis 68 of the prism window 50.

Figure 5:
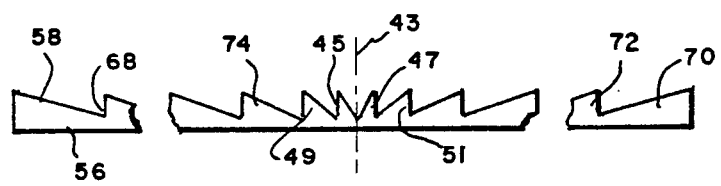
FIG. 5 is a sectional view along line 5—5 of FIG. 4.

The prism window 50 is shown in greater detail in FIG. 5, which shows a sectional view along line 5—5 of FIG. 1 on an expanded scale. As shown in FIG. 1, the faceted faces 58 are formed by a plurality of concentric V-grooves 68 which define, therebetween, prisms 74 of a triangular cross-section. Each prism 74 has a long face 70 and a short face 72 and is oriented in the assembly with its long face 70 medially and its short face 72 laterally. Since the prism combines magnification properties, the individual prisms 74 have incrementally greater face angles medially. The variable face angles of the Fresnel prism are symmetrical about the center axis 43, with equally varying face angles at either side of said axis. For example, face angles 45 and 47 are equal, and face angles 49 and 51 are equal, since each of the respective pair of prisms is equidistant to center axis 43. This design provides increasingly lesser refraction of the image segments as the distance of the prisms from center axis 43 is increased. The resultant fused image 20 as described in FIG. 4 would therefore appear enlarged, and prism/lens window 50 would be performing, optically, as a magnifier and a converging refractory prisms. The prism window 50 could also be of longitudinal V-groove design as shown for the Fresnel prism window of FIG. 1, with the exception that the V-grooves would have the regular and continuous variaion in face angles described with reference to FIG. 5, the resultant magnification will be cylindrical. If, however, prism window 50 is of the concentric V-groove design as described with reference to FIG. 5, the resultant magnification would be normal, or aspherical.

The variation of face angles of prism window 50 does not impair its convergence and divergence activity. Prism window 50, therefore, can be substituted for the Fresnel prism window 16 of FIG. 1, and will serve a dual purpose in the invention of magnification and image convergence and divergence, thereby obviating the necessity of a separate magnification lens.

Figure 6:
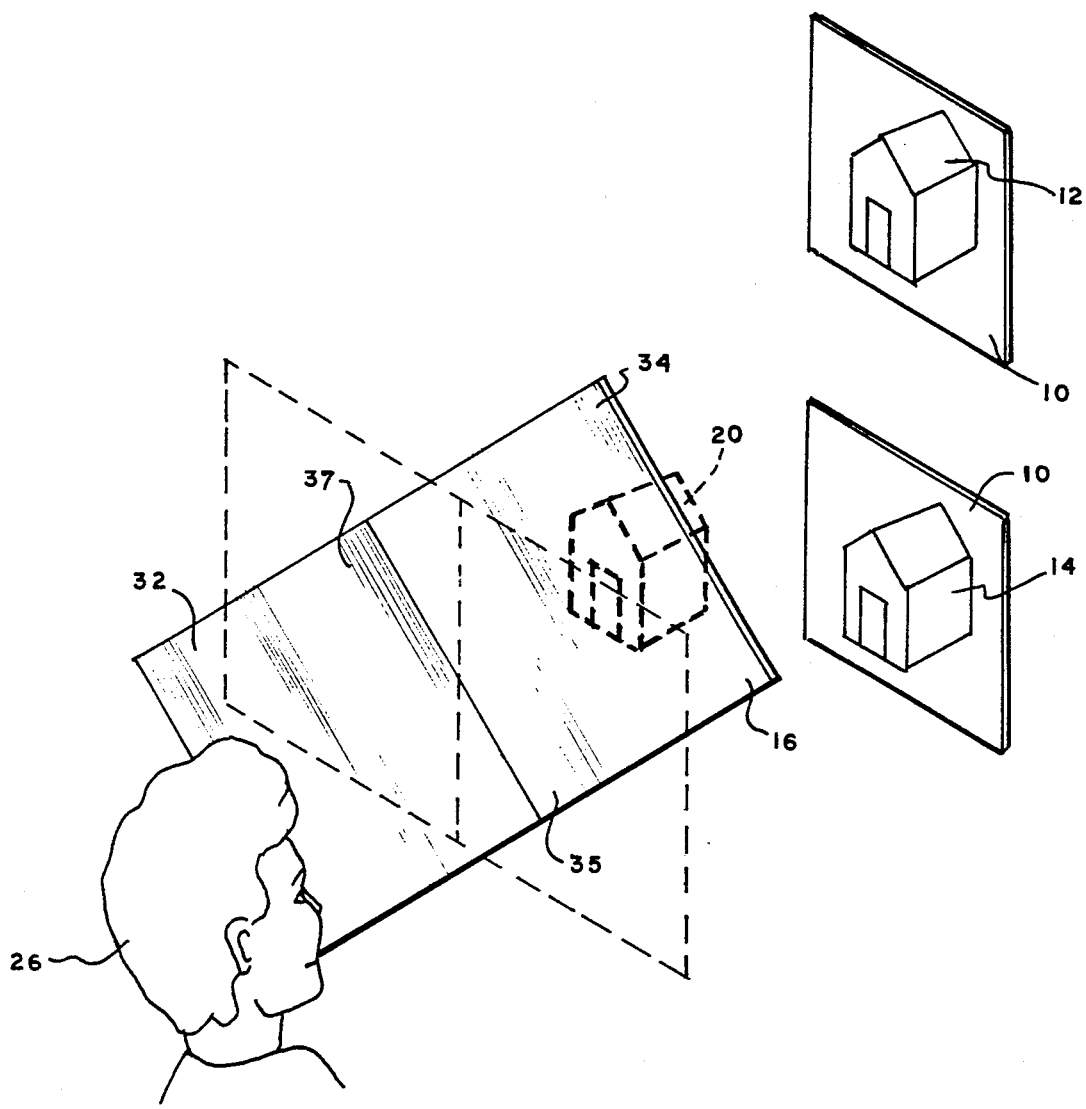
FIG. 6 is a view of a system with an alternative image display.
Figure 7:
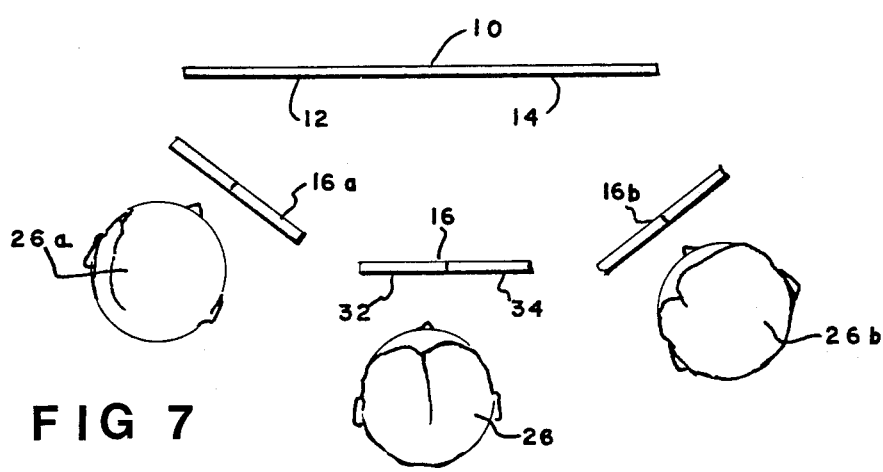
FIG. 7 illustrates the system with multiple observers.

Referring now to FIG. 6, an alternative embodiment of the invention is illustrated wherein screen 10 receives or displays vertically stacked images 12 and 14. Vertical stacking of stereoscopic images is, currently, the most popular recording method employed in motion picture stereoscopy, and this invention can be used with this method of image display also. Fresnel prism window 16 which is employed in FIG. 6 is substantially identical to that described with reference to FIGS. 1 through 5, however, the prism window is rotated from 30 to 60 degrees, preferably 45 degrees, from the position previously illustrated (shown in phantom lines) to correspond to the vertical stacking of stereoscopic images 12 and 14. This would be the same degree of rotation relative to the observer's ocular plane, i.e., the imaginary plane common to the observer's left and right eyes. In this orientation, the observer's right eye views its respective image through the lower corner 39 of prism 34, and the observer's left eye views its respective image through the upper corner 37 of prism 32 of the prism window 16. The result is the same; a three dimensional image 20 is preceived.

The invention has been described with reference to the presently preferred and illustrated embodiments. It is not intended that the invention be unduly limited by this disclosure of the illustrated embodiments. Instead, it is intended that the invention be defined by the means, and their obvious equivalents, set forth in the following claims.

What is claimed is:

1. An optical stereoscopic viewing system which comprises
    (a) a prism assembly of a pair of thin plate prisms, each having a plano face and an opposite prism face formed with a plurality of parallel V-grooves defining therebetween a plurality of parallel triangular prisms oriented with their long sides medially and their short sides laterally, with all the long sides of said prisms at equal angles of inclination to said plano face with said thin plate prisms being abutted into a joined relationship along their medial edges; and
    (b) left and right stereoscopic imaging surfaces positioned side by side.
2. The prism assembly of claim 1 wherein said grooves are straight, and parallel to the abutted medial edges of said prisms.
3. The prism assembly of claim 1 wherein said gooves are concentric circular grooves oriented convex medially and concave laterally with the centers of their concentricity lateral in said assembly.
4. The prism assembly of claim 1 including a hairline division mark along the abutted medial edges of said prisms.
5. The optical stereoscopic assembly of claim 1 wherein said imaging surfaces provide for vertically disposed left and right stereoscopic images, and said viewing prism is tilted from 30 to 60 degrees relative to the occular plane of an observer.
6. An optical stereoscopic viewing system which comprises
    (a) a prism assembly of a pair of thin plate prisms abutted into a joined relationship along their medial edges at the center of the assembly, each having a plano face and an opposite prism face formed with a plurality of parallel V-grooves defining therebetween a plurality of parallel triangular prisms oriented with their long sides medially and their short sides laterally, and wherein said prisms have equally varying and incrementally greater apex angles laterally to each side of said center, whereby said prism can function to magnify images; and
    (b) left and right stereoscopic imaging surfaces positioned side by side.
7. A method to display and view right and left stereoscopic images which comprises:
    (a) displaying right and left stereoscopic images in a side-by-side orientation;
    (b) assembling a pair of thin face prisms, each having a plano face and an opposite prism face formed with a plurality of parallel V-grooves defining therebetween a plurality of parallel triangular prisms, each with a long and a short face and with all of the long faces of said triangular prisms at equal angles of inclination to said plano face in front of an observer with the long faces of the prisms medially and the short faces laterally and abutting the prisms along their medial edges; and
    (c) centrally positioning the assembled pair of prisms between the viewer and the display of the stereoscopic images and adjusting the distance of the assembled pair of prisms to the display until a three dimensional image is perceived by the observer.
8. The method of claim 7 wherein said grooves are straight, and parallel to the joined medial edges of said prisms.
9. The method of claim 7 wherein said grooves are concentric circular grooves oriented convex medially and concave laterally with the centers of their concentricity lateral in said assembly.
10. The method of claim 7 wherein said thin face prisms have equally varying and incrementally greater apex angles laterally to each side of the abutted medial edges of said prisms whereby said prisms can function to magnify images.
11. The method of claim 7 wherein said images are displayed in a vertical array and wherein said assembled pair of prisms is tilted from 30 to 60 degrees relative to the occular plane of the viewer.
12. The method of claim 7 wherein a plurality of pairs of prisms are assembled for a like plurality of viewers and positioned, one each for each viewer, between its respective viewer and said image display.

* * * * *

UNITED STATES PATENT AND TRADEMARK OFFICE
CERTIFICATE OF CORRECTION

PATENT NO.   :   4,772,094

DATED        :   September 20, 1988

INVENTOR(S)  :   David M. Sheiman

It is certified that error appears in the above-identified patent and that said Letters Patent is hereby corrected as shown below:

In claim 3, column 5, line 65, change "gooves" to --grooves--

Signed and Sealed this

Twenty-first Day of March, 1989

Attest:

DONALD J. QUIGG

*Attesting Officer*      Commissioner of Patents and Trademarks